M. P. Rose
Adjustable Plow

117335          PATENTED JUL 25 1871

Witnesses
Brock Johnson
Wm. P. Seares

Inventor
M. P. Rose
By C. W. M. Smith
his Atty

UNITED STATES PATENT OFFICE.

MONTGOMERY P. ROSE, OF NAPA, CALIFORNIA.

IMPROVEMENT IN PLOWS.

Specification forming part of Letters Patent No. 117,335, dated July 25, 1871.

*To all whom it may concern:*

Be it known that I, MONTGOMERY P. ROSE, of Napa, in the county of Napa and State of California, have invented an Improvement in Plows; and I do hereby declare that the following is a full and exact description of the same, reference being had to the accompanying drawing and to the letters of reference marked thereon.

This invention relates to that class of plows that is principally employed for hilling or hoeing; and consists mainly in so constructing the plow that the beam and handles can be carried to one side or eccentric to the line of travel, and the share of the plow be caused to throw the earth to the hill without disturbing materially the corn or vines to be cultivated. For this purpose the vertical standard or lever is linked to the plow-beam and moves on a pivot or pin near the top of the mold-board, and the lower end of the standard moves on a curved arc or brace extending from the lower side to the mold-board or share. The handles of the plow are made adjustable by changing a bolt from one hole to another on a horizontal bar at the end of the forked standard.

Figures 1, 2:
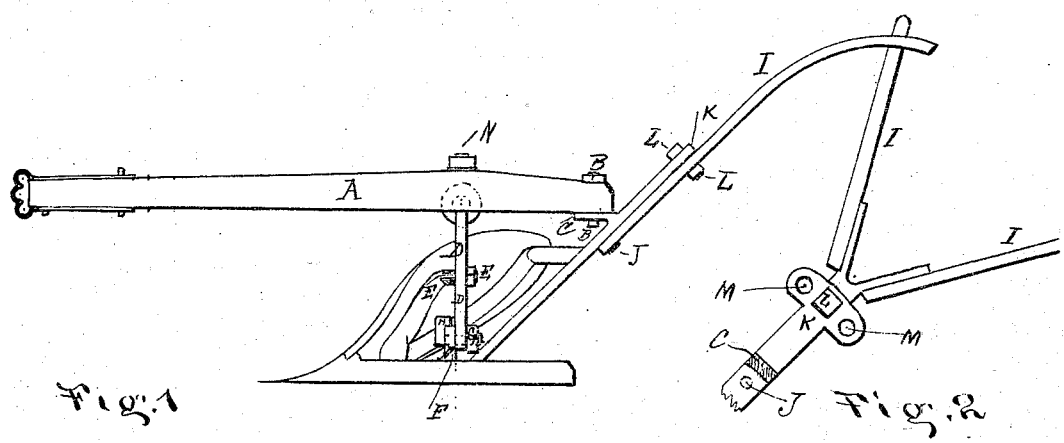
Figures 3, 4:
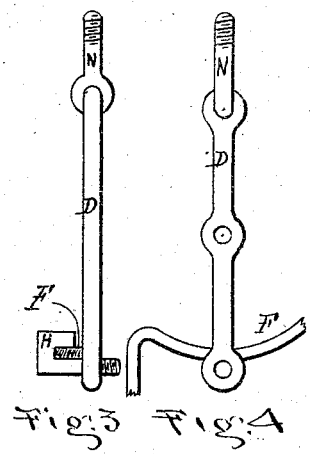

In the drawing, Figure 1 is a side elevation of a plow having my improvements. Figs. 2, 3, 4, are details of same.

To enable others skilled in the art to which my invention appertains to make and use the same, I will now proceed to describe fully its construction and the appliances for carrying it into effect.

A is the beam, pivoted or hinged at its extremity by means of the bolt B and projection C in such a manner as to allow of a horizontal motion of the beam without moving the other parts of the plow. The beam A is further supported and secured to the plow by means of the eyebolt N forming a joint or hinge with the extremity of the lever D. The fulcrum E of the lever D is at about the center of its length and fixed near the top of the mold-board. The lower end of the lever D is secured to the fixed arc F by means of the nut G and hook H.

It is evident that by loosening the nut G so that the hook H may slide along the arc F the beam A may be set at various angles with the direction of the furrow, so that the horse or horses may not come too near the rows of plants when plowing between them.

The handles I are hinged at J, and can be adjusted to any angle by shifting along the plate K, and are secured or clamped in the required position by the bolt L passing through the holes M.

By setting both the beam A and handles I out of the line and on the same side of the furrow in plowing along a row of low vines, shrubs, or other plants, the tops of which overhang their trunks or stems, the furrow may be turned quite close to the trunks or stems, while the horse and plowman keep clear of the tops.

Having thus described my invention, what I claim, and desire to secure by Letters Patent, is—

1. The lever D, adapted to swing upon the arc F and thus change the relative position of the beam and share, as described.

2. The combination of the beam A and the share with the lever D and its connections, and the projection C swinging on bolt B, as described.

In witness whereof I have hereunto set my hand and seal.

MONTGOMERY P. ROSE. [L. S.]

Witnesses:
C. W. M. SMITH,
H. S. TIBBEY.